US011174812B2

(12) United States Patent
Koike et al.

(10) Patent No.: US 11,174,812 B2
(45) Date of Patent: Nov. 16, 2021

(54) SLIDING MEMBER AND PRODUCTION METHOD THEREFOR

(71) Applicants: TOYOTA MOTOR EAST JAPAN, INC., Kurokawa-gun (JP); TOYOTA JIDOSHA KABUSHIKI KAISHA, Toyota (JP); TOCALO Co., Ltd., Kobe (JP)

(72) Inventors: Ryo Koike, Kurokawa-gun (JP); Kazuyoshi Manabe, Toyota (JP); Akihiro Kanno, Akashi (JP)

(73) Assignees: TOYOTA MOTOR EAST JAPAN, INC., Kurokawa-gun (JP); TOYOTA JIDOSHA KABUSHIKI KAISHA, Toyota (JP); TOCALO Co., Ltd., Kobe (JP)

(*) Notice: Subject to any disclaimer, the term of this patent is extended or adjusted under 35 U.S.C. 154(b) by 0 days.

(21) Appl. No.: 16/545,252

(22) Filed: Aug. 20, 2019

(65) Prior Publication Data

US 2020/0063688 A1  Feb. 27, 2020

(30) Foreign Application Priority Data

Aug. 22, 2018 (JP) .............................. JP2018-155834

(51) Int. Cl.
*B32B 15/00* (2006.01)
*F02F 3/10* (2006.01)
(Continued)

(52) U.S. Cl.
CPC ............... *F02F 3/10* (2013.01); *B32B 15/01* (2013.01); *C10M 103/04* (2013.01); *C23C 4/08* (2013.01);
(Continued)

(58) Field of Classification Search
None
See application file for complete search history.

(56) References Cited

U.S. PATENT DOCUMENTS

2002/0051851 A1* 5/2002 Barbezat ................... C23C 4/16
427/580
2003/0164150 A1* 9/2003 Barbezat ................ C23C 4/134
123/193.2
(Continued)

FOREIGN PATENT DOCUMENTS

CN        1573143 A    2/2005
CN        1598116 A    3/2005
(Continued)

OTHER PUBLICATIONS

Skopp et al., "Thermally sprayed titanium suboxide coatings for piston ring/cylinder liners under mixed lubrication and dry-running conditions", Oct. 2006, Wear, vol. 262, pp. 1061-1070. (Year: 2006).*

(Continued)

*Primary Examiner* — Seth Dumbris
(74) *Attorney, Agent, or Firm* — Oblon, McClelland, Maier & Neustadt, L.L.P.

(57) ABSTRACT

A sliding member capable of improving friction characteristics under an environment of a lubricant containing Mo, and a production method therefor, is provided. The sliding member contains a sliding portion formed of a metallic material having a Ti-containing thermally sprayed coating on a surface layer part of the sliding portion. The sliding member slides under the environment of the lubricant containing Mo as an additive, in which active Ti exposed on a surface by sliding accelerates decomposition reaction of the additive contained in the lubricant to form a molybdenum (Continued)

disulfide-containing low-friction coating having low friction on the surface of the sliding portion.

4 Claims, 3 Drawing Sheets

(51) Int. Cl.
    *C23C 4/134* (2016.01)
    *C23C 4/08* (2016.01)
    *C10M 103/04* (2006.01)
    *B32B 15/01* (2006.01)
    *C10N 50/08* (2006.01)

(52) U.S. Cl.
    CPC ....... *C23C 4/134* (2016.01); *C10M 2201/053* (2013.01); *C10N 2050/08* (2013.01); *F02F 2200/00* (2013.01); *Y10T 428/12806* (2015.01)

(56) References Cited

U.S. PATENT DOCUMENTS

| | | | |
|---|---|---|---|
| 2004/0191110 A1* | 9/2004 | Nakanishi | C23C 4/12 420/122 |
| 2010/0247004 A1* | 9/2010 | Suzuki | F16J 9/26 384/13 |
| 2012/0114964 A1* | 5/2012 | Honda | C22C 38/22 428/610 |
| 2014/0038868 A1* | 2/2014 | Mori | C23C 14/352 508/300 |
| 2014/0102399 A1* | 4/2014 | Da Rocha Mordente | C23C 28/048 123/193.2 |
| 2019/0144978 A1 | 5/2019 | Koike et al. | |

FOREIGN PATENT DOCUMENTS

| | | | | |
|---|---|---|---|---|
| CN | 101848980 A | | 9/2010 | |
| CN | 107641795 A | | 1/2018 | |
| CN | 108884408 A | | 11/2018 | |
| FR | 3065008 A1 | * | 10/2018 | ............. C23C 24/04 |
| JP | 2004100645 A | * | 4/2004 | ............... F02F 1/00 |
| JP | 2004115826 A | * | 4/2004 | |
| JP | 2007-191795 A | | 8/2007 | |
| JP | 2016-117949 A | | 6/2016 | |

OTHER PUBLICATIONS

Kan Ding et al., "Study on the machining of thermal spray cylinder for the sleeveless engine," Proceedings of 2012 JSPE (The Japan Society for Precision Engineering) Spring Conference, pp. 249-250, Tokyo, Japan, Mar. 14, 2012 (w/ English translation).

Combined Chinese Office Action and Search Report dated Apr. 23, 2021 in Chinese Patent Application No. 201910618656.2, 7 pages.

Deshpande, P., et al., "Tribocatalytic behaviour of a $TiO_2$ atmospheric plasma spray (APS) coating in the presence of the friction modifier MoDTC: a parametric study", The Royal Society of Chemistry, RSC Advances, Dec. 31, 2018, Thomas Graham House, Cambridge Royal Society of Chemistry, Thomas Graham House (290), Science Park, Milton Road, Cambridge, CB4 0WF, 24 pages.

U.S. Appl. No. 16/193,315, filed Nov. 16, 2018, US2019-0144978, Koike, Ryo et al.

U.S. Appl. No. 16/365,974, filed Mar. 27, 2019, Koike, Ryo et al.

* cited by examiner (A)

(B)

(C)

(D)

SLIDING MEMBER AND PRODUCTION METHOD THEREFOR

TECHNICAL FIELD

The present invention relates to a sliding member having excellent friction characteristics and a production method therefor.

BACKGROUND ART

A sliding member used for an engine of an automobile is required to improve fuel consumption by reducing friction. As a method for reducing the friction, various methods have been reported so far. For example, Non-Patent Literature 1 describes that an iron-based alloy-thermally sprayed coating is formed on a surface layer part of a sliding portion, whereby the friction between a piston ring and a liner inner surface can be reduced, or friction resistance of a cylinder liner and fuel consumption of an engine can be improved.

Moreover, in recent years, a friction modifier has been added to engine oil to reduce the friction. As the friction modifier that has been most frequently used so far, molybdenum dithiocarbamate or molybdenum dialkyl dithiocarbamate (MoDTC) is available.

CITATION LIST

Patent Literature

Patent Literature 1: JP 2016-117949 A
Patent Literature 2: JP 2007-191795 A

Non-Patent Literature

Non-Patent Literature 1: Kan Ding et al., "Study on the machining of thermal spray cylinder for the sleeveless engine," Proceedings of 2012 JSPE (The Japan Society for Precision Engineering) Spring Conference, pp. 249-250

SUMMARY OF INVENTION

Technical Problem

However, neither an action mechanism of a friction modifier containing molybdenum (Mo) as an additive nor the reason why an effect of the friction modifier is different depending on a material is specified. For example, also in the case of a sliding member on which an iron-based alloy-thermally sprayed coating is formed, as described in Non-Patent Literature 1, friction can be reduced by adding the friction modifier containing Mo to a lubricant, but a possibility of presence of a material further reducing the friction is also considered, and development of the material is desired.

It should be noted that Patent Literature 1 describes a piston ring on which a thermally sprayed coating obtained by thermally spraying thermal spraying powder containing a solid lubricant, and metal such as iron (Fe), tungsten (W) and chromium (Cr) is formed on a substrate. According to Patent Literature 1, although wear resistance can be improved, nothing is described on reduction of friction, and a specific structure is different from the present invention.

Moreover, Patent Literature 2 describes that an Fe-containing thermally sprayed coating is formed on a cylinder sliding surface of an engine block by plasma spraying, and oxygen is incorporated into this thermally sprayed coating, and ceramics such as titanium oxide ($TiO_2$) is added thereto. According to Patent Literature 2, although friction can be reduced, an effect of reducing the friction cannot be obtained under an environment of a lubricant containing Mo because a thermal spraying material containing a large amount of ceramics is used, and a specific structure is different from the present invention.

The present invention has been made on the basis of such problems, and is contemplated for providing a sliding member capable of improving friction characteristics under an environment of a lubricant containing Mo, and a production method therefor.

Solution to Problem

A sliding member of the present invention is a member sliding under an environment of a lubricant containing Mo as an additive, in which a sliding portion is formed of a metallic material, and the sliding member has, on a surface layer part of the sliding portion, a Ti-containing thermally sprayed coating formed by thermally spraying, as a thermal spraying material, a metallic material mainly containing titanium (Ti) as a composition.

A production method for a sliding member according to the present invention is contemplated for producing the sliding member sliding under an environment of a lubricant containing Mo as an additive, and including a thermally sprayed coating forming step of thermally spraying, as a thermal spraying material, a metallic material containing Ti as the composition on a surface of the sliding portion formed of a metallic material to form a Ti-containing thermally sprayed coating at a surface layer part of the sliding portion.

Advantageous Effects of Invention

A sliding member according to the present invention has a Ti-containing thermally sprayed coating at a surface layer part of a sliding portion, and therefore active Ti exposed on a surface by sliding can accelerate decomposition reaction of an additive contained in a lubricant to effectively form a molybdenum disulfide-containing low-friction coating having low friction on the surface of the sliding portion. Accordingly, friction can be reduced as compared with a conventional material containing Fe. Thus, if the sliding member is used for a sliding member of an automobile, the friction can be reduced to improve fuel consumption.

Moreover, a fine pit is present in the thermally sprayed coating, and therefore the pit functions as an oil pocket, whereby the friction can be reduced. In particular, surface roughness of the sliding portion is adjusted to 3.0 μm or less in terms of a sum of effective load roughness (Rk) and initial abrasion height (Rpk), and therefore the friction can be further reduced.

Further, an abundance ratio of oxygen contained in the thermally sprayed coating is adjusted to 10 mass % or less, and therefore the decomposition reaction of the additive is further accelerated by allowing Ti to be present in an active state, and the friction can be further reduced.

In addition thereto, the thermally sprayed coating is formed by atmospheric plasma spraying, and therefore the coating can be stably and easily formed.

DESCRIPTION OF EMBODIMENTS

Hereinafter, embodiments of the present invention will be described in detail with reference to drawings.

Figure 1:
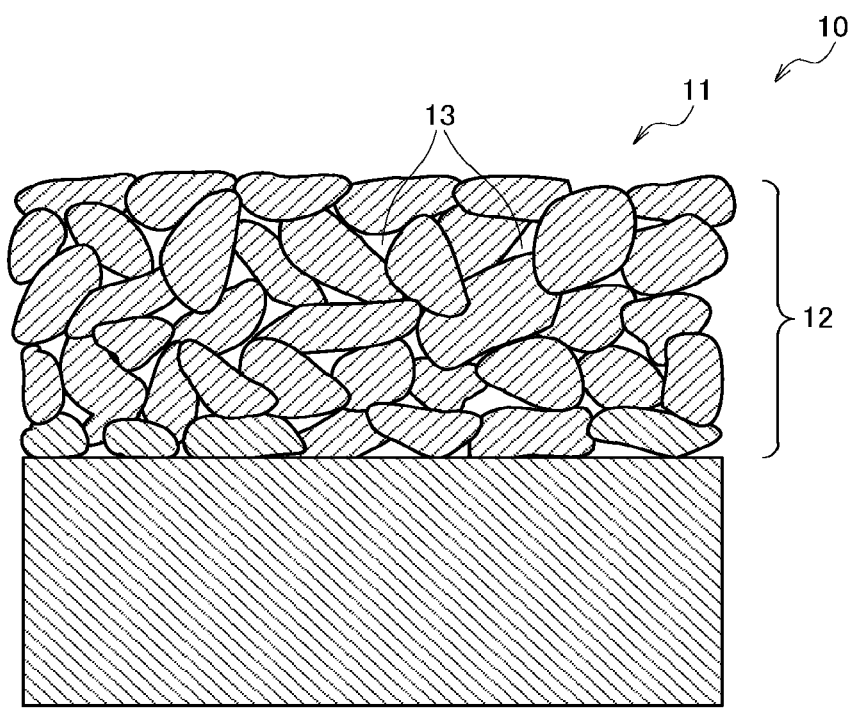
FIG. 1 is a schematic diagram showing a configuration of a surface layer part in a sliding portion of a sliding member according to one embodiment of the present invention.
Figure 2:
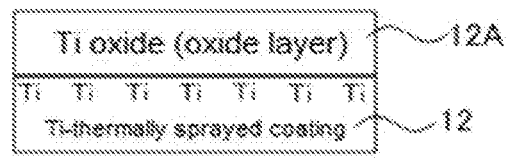
FIG. 2 is a schematic diagram for describing action of a surface layer part during sliding in the sliding portion of the sliding member shown in FIG. 1.
Figure 2:
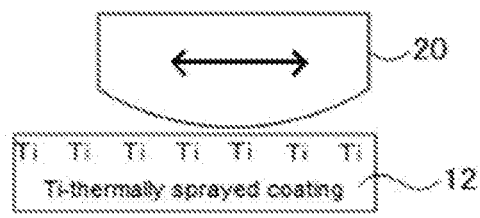
Figure 2:
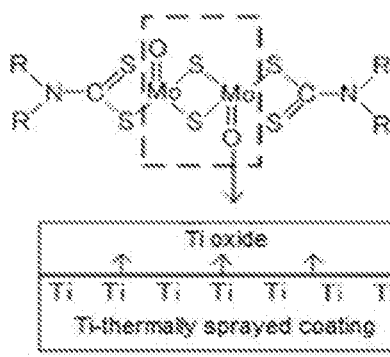
Figure 2:
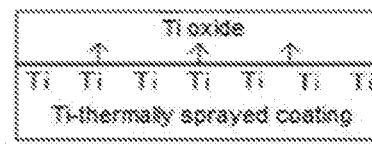
Figure 2:
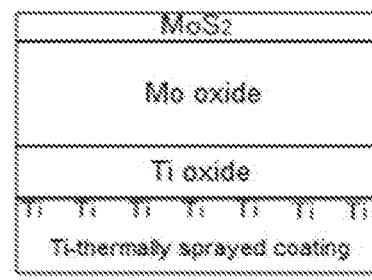

FIG. 1 is a diagram schematically showing a configuration of a surface layer part in a sliding portion 11 of a sliding member 10 according to one embodiment of the present invention. FIG. 2 is a diagram for describing function of a surface layer part during sliding in a sliding portion 11 of a sliding member 10. This sliding member 10 slides under an environment of a lubricant containing Mo as an additive, and is preferably used for a sliding member of an automobile, specifically, a cylinder bore, for example. It should be noted that a term "lubricant containing Mo" means the lubricant to which an additive containing Mo as a constituent element is added, and means the lubricant to which organic molybdenum such as MoDTC is added as the additive, for example. The additive containing Mo as the constituent element in such a manner is used as a friction modifier, for example.

In this sliding member 10, the sliding portion 11 is configured of a metallic material. A term "sliding portion 11" means a part in which members rub against each other. Examples of the metallic material preferably include steel or cast iron.

The sliding portion 11 has, on the surface layer part thereof, a Ti-containing thermally sprayed coating 12 formed by thermally spraying, as a thermal spraying material, a metallic material mainly containing Ti as a composition. A term "metallic material mainly containing Ti" means a metallic material containing 60 mass % or more of Ti, and preferably a metallic material containing 90 mass % or more of Ti. A fine pit 13 is present in the thermally sprayed coating 12, and this pit 13 functions as an oil pocket, whereby the sliding portion 11 is configured so as to hold an oil film during sliding. Further, the thermally sprayed coating 12 contains Ti having small free energy for forming oxide to be easily formed into a passive state, and therefore the thermally sprayed coating 12 is configured in such a manner that action of Ti can accelerate the decomposition reaction of the additive containing Mo as the constituent element such as MoDTC, which is added to the lubricant, and as shown in FIG. 2, for example, to form a larger amount of a molybdenum disulfide-containing low-friction coating 14 having low friction on a surface of the thermally sprayed coating 12.

It should be noted that a mechanism according to which Ti causes decomposition of the additive containing Mo as the constituent element such as MoDTC is estimated as described below. First, as shown in FIG. 2(A), a Ti oxide layer 12A is present on a surface of the sliding portion 11, specifically, on a surface of the thermally sprayed coating 12. As shown in FIG. 3(B), if the surface is scraped by friction caused by sliding with the sliding member 20, active Ti present in the thermally sprayed coating 12 is exposed thereon. As shown in FIG. 2(C), this active Ti deprives oxygen of the additive containing Mo as the constituent element such as MoDTC, and the additive deprived of oxygen is decomposed. As shown in FIG. 2(D), the additive decomposed forms molybdenum disulfide ($MoS_2$) having low friction to form the molybdenum disulfide-containing low-friction coating 14 on the surface of the thermally sprayed coating 12.

Surface roughness of the sliding portion 11, namely, surface roughness of the thermally sprayed coating 12 is preferably 3.0 μm or less in terms of a sum of effective load roughness (Rk) and initial abrasion height (Rpk). The reason is that the friction can be further reduced. In addition, an abundance ratio of oxygen contained in the thermally sprayed coating 12 is preferably 10 mass % or less, and more preferably 8 mass % or less. The reason is that the friction can be further reduced. In addition, as a means for obtaining low friction, hardening of a coating is generally effective, and therefore the abundance ratio of oxygen is preferably 1 mass % or more, and more preferably 2 mass % or more.

This sliding member 10 can be produced as described below, for example. First, for example, the sliding member 10 is molded, heat-treated, and polished (sliding portion forming step). Next, for example, the metallic material containing Ti as the composition (specifically, Ti-containing metallic powder) is thermally sprayed, as the spraying material, on the surface of the sliding portion 11 to form the Ti-containing thermally sprayed coating 12 on the surface layer part of the sliding portion 11 (thermally sprayed coating forming step). In the thermally sprayed coating forming step, the thermally sprayed coating 12 is preferably formed by atmospheric plasma spraying. The reason is that the thermally sprayed coating 12 can be stably and easily formed.

Thus, according to the present embodiment, the sliding member 10 has the Ti-containing thermally sprayed coating 12 on the surface layer part of the sliding portion 11, and therefore active Ti exposed on the surface by sliding can accelerate the decomposition reaction of the additive contained in the lubricant to form the molybdenum disulfide-containing low-friction coating having low friction on the surface of the sliding portion 11. Accordingly, the friction can be reduced. Thus, if the sliding member 10 is used for the sliding member of the automobile, the friction can be reduced to improve fuel consumption.

Moreover, the fine pit 13 is present in the thermally sprayed coating 12, and therefore this pit 13 functions as the oil pocket, whereby the friction can be reduced. In particular, the surface roughness of the sliding portion 11 is adjusted to 3.0 μm or less in terms of the sum of the effective load roughness (Rk) and the initial abrasion height (Rpk), and therefore the friction can be further reduced.

Further, the abundance ratio of oxygen contained in the thermally sprayed coating 12 is adjusted to 1 mass % or more and 10 mass % or less, and further adjusted to 2 mass % or more and 8 mass % or less, and therefore the friction can be further reduced.

In addition thereto, the thermally sprayed coating 12 is formed by the atmospheric plasma spraying, and therefore the thermally sprayed coating 12 can be stably and easily formed.

EXAMPLES

Example 1, Comparative Example 1

As Example 1, a disc-shaped test piece formed of bearing steel (SUJ2) was arranged, and atmospheric plasma spraying was performed by using a Ti-containing metallic material as a thermal spraying material to form a Ti-containing thermally sprayed coating 12. On the above occasion, two kinds of metallic powder were arranged as the thermal spraying material, and a plurality of thermally sprayed coatings 12 were formed for each thermal spraying material. A composition of the first kind of metallic powder as the thermal spraying material is Ti: 100 mass %, and a composition of the second kind of metallic powder is Ti: 90 mass %, aluminum (Al): 6 mass % and vanadium (V): 4 mass %. Each thermally sprayed coating 12 was formed, and then polished to adjust surface roughness of each thermally sprayed coating 12. The surface roughness was expressed in terms of a sum of effective load roughness (Rk) and initial abrasion height (Rpk).

A ball-on-disk-type friction test was conducted on each test piece prepared, in a lubricant prepared using poly-α-olefin (PAO8) as base oil and containing, as an additive, MoDTC in 200 ppm in terms of an amount of Mo. As a counterpart material, bearing steel (SUJ2) was applied. A temperature of the lubricant was adjusted to 80° C. keeping constant, a load was adjusted to 10 N, and a sliding speed was adjusted to 0.5 m/s, and a friction coefficient after stabilization was measured.

As Comparative Example 1, a plurality of thermally sprayed coatings were formed to adjust surface roughness in the same manner as in Example 1 except that a test piece similar to the test piece in Example 1 was arranged, and the thermal spraying material was changed to a Fe—Cr-based metallic material. A composition of metallic powder of the thermal spraying material is Fe: 98.2 mass % and Cr: 1.8 mass %. It should be noted that as the thermal spraying material in Comparative Example 1, a material having physical properties close to the physical properties of the thermal spraying material in Example 1 was used to be comparable in hardness of the thermally sprayed coating. A friction coefficient was also measured on each test piece in Comparative Example 1 in the same manner as in Example 1.

Figure 3:
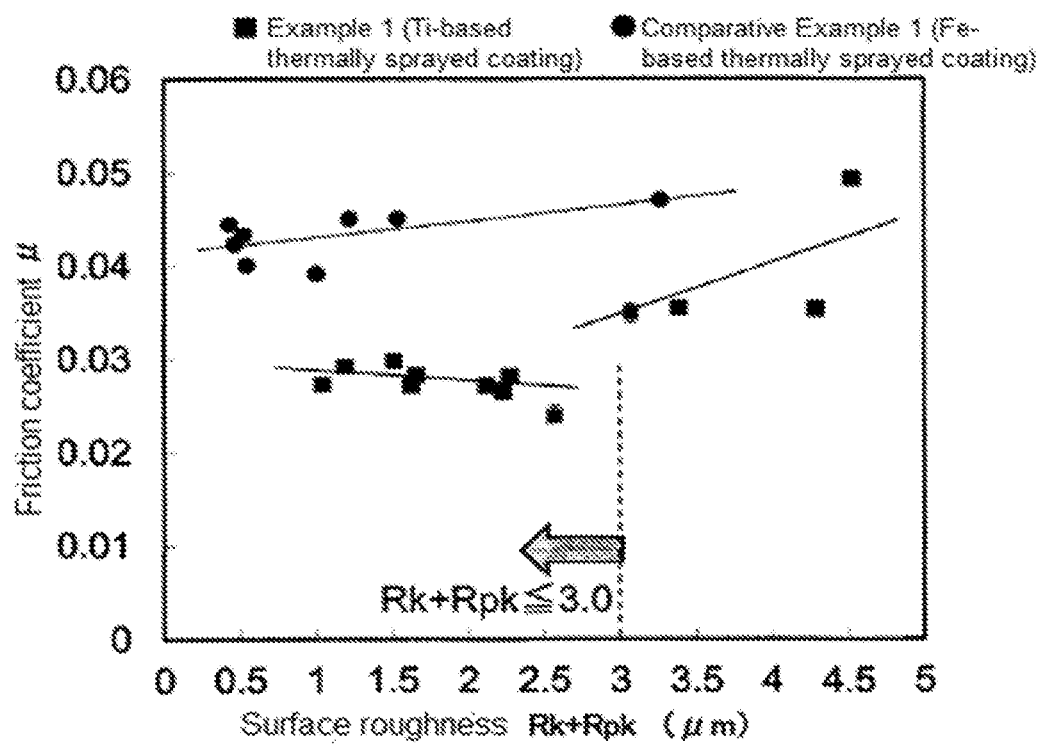
FIG. 3 is a characteristics diagram showing a relationship between surface roughness and a friction coefficient.

The results obtained are shown in FIG. 3. As shown in FIG. 3, according to Example 1, the friction coefficient was able to be reduced by as much as 30% to 40%, as compared with Comparative Example 1. Further, in Example 1, when the surface roughness (Rk+Rpk) was 3.0 μm or less, the friction coefficient was able to be further reduced to be 0.03 or less. It should be noted that two kinds of thermal spraying materials were used in Example 1, and no difference of the friction coefficient according to the composition of the thermal spraying material was found. In addition, when a cross-sectional structure of a surface of the test piece after conducting the friction test was observed with a transmission electron microscope, it was confirmed that a molybdenum disulfide-containing low-friction coating 14 is formed on the surface of the Ti-containing thermally sprayed coating 12.

More specifically, it was found that, if the sliding member is configured in such a manner that the metallic material containing Ti as the composition is thermally sprayed to form the Ti-containing thermally sprayed coating 12, the molybdenum disulfide-containing low-friction coating 14 having low friction can be formed on the surface of the thermally sprayed coating 12, and the friction can to be reduced. In addition, it was found that, if the surface roughness is adjusted to 3.0 μm or less in terms of the sum of the effective load roughness (Rk) and the initial abrasion height (Rpk), the friction can be further reduced.

Example 2

Figure 4:
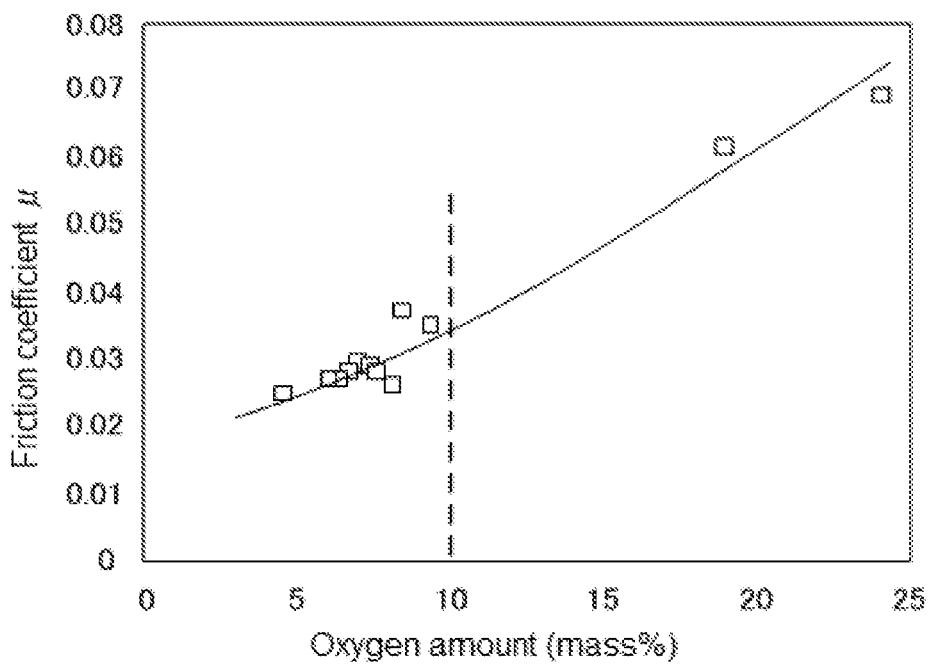
FIG. 4 is a characteristics diagram showing a relationship between an oxygen amount of a thermally sprayed coating and a friction coefficient.

Thermally sprayed coating 12 were formed on test pieces, respectively, by using two kinds of thermal spraying materials in the same manner as in Example 1. On the above occasion, spraying output power was changed in five stages, whereby an oxygen amount in the thermally sprayed coating 12 was changed. A friction coefficient was examined on each test piece prepared, in the same manner as in Example 1. The results obtained are shown in FIG. 4. As shown in FIG. 4, it was found that, as the oxygen amount in the thermally sprayed coating 12 is smaller, the friction coefficient tends to become smaller, and if the oxygen amount in the thermally sprayed coating 12 is adjusted to 10 mass % or less, the friction coefficient can be adjusted to be smaller than 0.04, and such a case is preferred.

As described above, the present invention has been described according to the embodiments, but the present invention is not limited to the above-described embodiments, and can be modified in various manners.

REFERENCE SIGNS LIST

10: Sliding member; 11: sliding portion; 12: thermally sprayed coating; 12A: oxide layer; 13: pit; 14: low friction coating

The invention claimed is:

1. A sliding member, sliding under an environment of a lubricant containing molybdenum (Mo) as an additive, comprising:
a sliding portion having a body of a metallic material; and
a thermal sprayed coating comprising Ti on a surface layer part of the sliding portion;
wherein
a content of Ti in the thermal sprayed coating is 60% or more by mass, and
a content of oxygen in the thermal sprayed coating is from 1% to 10% by mass.

2. The sliding member according to claim 1, wherein a surface roughness of the sliding portion is 3.0 μm or less in terms of a sum of effective load roughness (Rk) and initial abrasion height (Rpk).

3. A production method for a sliding member sliding under an environment of a lubricant containing molybdenum (Mo) as an additive according to claim 1, comprising:
a thermally sprayed coating forming step of thermally spraying, as a thermal spraying material, a metallic material containing titanium (Ti) as a composition on a surface of a sliding portion formed of the metallic material to form a Ti-containing thermally sprayed coating having a content of Ti of 60% or more by mass, and a content of oxygen of from 1% to 10% by mass at a surface layer part of the sliding portion.

4. The production method for the sliding member according to claim 3, wherein the thermally sprayed coating is formed by atmospheric plasma spraying in the thermally sprayed coating forming step.

* * * * *